United States Patent [19]

Yajima et al.

[11] 4,264,361
[45] Apr. 28, 1981

[54] HEAT-RESISTANT COMPOSITE MAGNET AND METHOD FOR PRODUCING THE SAME

[75] Inventors: Seishi Yajima; Masaaki Hamano; Yoshio Hasegawa, all of Higashi; Kimiyuki Kamino, Chofu; Takehiro Yamane, Sakura, all of Japan

[73] Assignees: Mitsubishi Seiko Kabushiki Kaisha, Tokyo; The Foundation: The Research Institute for Special Inorganic Materials, Ibaragi, both of Japan

[21] Appl. No.: 37,144

[22] Filed: May 8, 1979

[30] Foreign Application Priority Data

May 15, 1978 [JP] Japan .................................. 53-56629

[51] Int. Cl.³ .............................................. C04B 35/04
[52] U.S. Cl. ................................. 75/230; 148/31.57; 148/101; 148/103; 252/62.54
[58] Field of Search ...................... 148/31.57, 101, 103, 148/104, 108, 105; 252/62.54, 62.55; 75/230; 428/545

[56] References Cited

U.S. PATENT DOCUMENTS

| | | | |
|---|---|---|---|
| 2,601,212 | 6/1952 | Polydoroff | 252/62.54 |
| 2,744,040 | 5/1966 | Altmann | 252/62.54 |
| 4,146,671 | 3/1979 | Fujiyama et al. | 252/62.54 |

OTHER PUBLICATIONS

Chemistry and Technology of Silicones, Walter Noll 1968, Academic Press Inc., pp. 332–338.

Primary Examiner—L. Dewayne Rutledge
Assistant Examiner—John P. Sheehan
Attorney, Agent, or Firm—Wenderoth, Lind & Ponack

[57] ABSTRACT

This invention relates to a heat-resistant composite magnet comprising 2 to 30% by weight of an organic-inorganic compound binder containing boron and silicon and 70 to 98% by weight of the powder of one or more permanent magnets.

This invention further relates to a method for producing a heat-resistant composite magnet, which comprises the steps of (a) adding the powder of one or more permanent magnets to a solution of an organic-inorganic compound binder containing boron and silicon dissolved in an organic solvent; (b) evaporating said solvent; (c) molding the resultant permanent magnet powder covered with said binder under a pressure of 0.1 to 5 tons/cm² in the presence or in the absence of a magnetic field of 12,000–5,000 oersted, the molded product being heated at 200°–450° C. during the molding or after the molding; and (d) cooling the molded product.

This invention still further relates to a method for producing a heat-resistant composite magnet, which comprises the steps of (a) molding the powder of one or more permanent magnet at room temperature under a pressure of 0.1 to 5 tons/cm² in the presence or in the absence of a magnetic field of 12,000–5,000 oersteds; (b) dipping the molded product in a solution of an organic-inorganic compound binder containing boron and silicon; (c) drying the dipped product; (d) heating the dried product at 200°–450° C.; and (e) cooling the heated product.

1 Claim, 2 Drawing Figures

HEAT-RESISTANT COMPOSITE MAGNET AND METHOD FOR PRODUCING THE SAME

BACKGROUND OF THE INVENTION

This invention relates to a heat-resistant composite magnet which can be used at a high temperature.

Heretofore, composite magnets comprising a combination of permanent magnet powder with thermoplastic resin or thermosetting resin have been widely used. A rubber magnet prepared by using natural rubber or synthetic rubber in place of the above resin and a composite magnet comprising a combination of Fe-Co type ultra-fine powder with lead as a binder are also well known. However, the usable upper limit temperature of any of these conventional composite magnets has been 150° C. at the highest.

Accordingly, a light magnet usable at a higher temperature is now in demand. An object of this invention is to satisfy this demand.

SUMMARY OF THE INVENTION

An object of this invention is to provide a heat-resistant composite magnet comprising 2 to 30% by weight of an organic-inorganic compound binder containing boron and silicon and 70 to 98% by weight of the powder of one or more permanent magnets.

A further object of this invention is to provide a method for producing a heat-resistant composite magnet, which comprises the steps of (a) adding the powder of one or more permanent magnets to a solution of an organic-inorganic compound binder containing boron and silicon dissolved in an organic solvent; (b) evaporating said solvent; (c) molding the resultant permanent magnet powder covered with said binder under a pressure of 0.1 to 5 tons/cm² in the presence or in the absence of a magnetic field of 12,000–5,000 oersteds, the molded product being heated at 200°–450° C. during the molding or after the molding; and (d) cooling the molded product.

A still further object of this invention is to provide a method for producing a heat-resistant composite magnet, which comprises the steps of (a) molding the powder of one or more permanent magnets at room temperature under a pressure of 0.1 to 5 tons/cm² in the presence or in the absence of a magnetic field of 12,000–5,000 oersteds; (b) dipping the molded product in a solution of an organic-inorganic compound binder containing boron and silicon; (c) drying the dipped product; (d) heating the dried product at 200°–450° C.; and (e) cooling the heated product.

BRIEF DESCRIPTION OF THE DRAWINGS

The accompanying

The accompanying

DETAILED DESCRIPTION OF THE INVENTION

Figure 1:
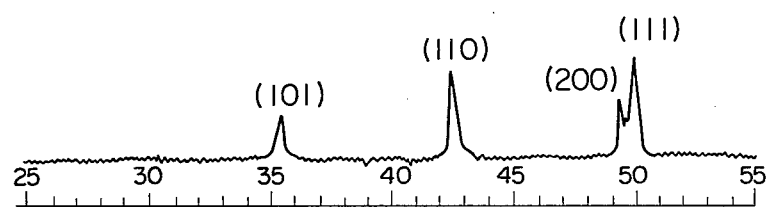
FIG. 1 shows the X-ray diffraction pattern of a face in parallel to the orientation direction of the SmCo₅ magnet powder of this invention.

This invention provides a heat-resistant composite magnet which comrpises (a) 2 to 30% by weight of an organic-inorganic compound binder containing boron and silicon and (b) 70 to 98% by weight of the powder of one or more permanent magnets selected from alnico case magnets, hard ferrite magnets and rare earth-cobalt magnets.

The organic-inorganic compound binder used in this invention is an organic-inorganic compound obtained by reacting an organoborosiloxane with one or more compounds selected from the group consisting of aliphatic polyhydric alcohols, aromatic alcohols, phenols, and aromatic carboxylic acids, at 250°–450° C. in an inert atmosphere such as nitrogen, argon and other rare gases. The reaction is usually carried out under normal pressure.

The organoborosiloxane used in this reaction has a bond of

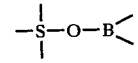

wherein a Si atom has organic groups such as an alkyl group (e.g. methyl, ethyl), a cycloalkyl group (e.g. cyclohexyl), an aryl group (e.g. phenyl) and a mixture thereof, a phenyl group being particularly preferable. This organoborosiloxane is well known. Examples of the organoborosiloxane used in this reaction include one or more compounds obtained by the dehydration-condensation reaction of boric acid with silane diol, the dehydrochlorination-condensation reaction of boric acid with diorganodichlorosilane, the dealcohol-condensation reaction of boric acid with diorganodialkoxysilane, the deester-condensation reaction of boric acid ester with diorganodialkoxysilane, and the reaction of boric acid with tri-functional silane (e.g. trichlorophenylsilane).

Examples of organic compounds to be reacted with the above organoborosiloxanes include aliphatic polyhydric alcohols such as ethylene glycol, glycerine and the like; aromatic alcohols such as benzyl alcohol and the like; phenols such as phenol, pyrocatechol, resorcinol, hydroquinone, orcin, pyrogallol, phloroglucinol, hydroxyhydroquinone, cresol, thymol, carvacrol, bisphenol-A, naphthol, binaphthol, anthranol, anthrahydroquinone and the like; and aromatic carboxylic acids such as benzoic acid, phthalic acid, isophthalic acid, terephthalic acid and the like. Among these organic compounds, aromatic alcohols, phenols and aromatic carboxylic acids are preferable. Particularly, phenols such as phenol and hydroquinone are preferable.

The above organic compounds are mixed with organoborosiloxanes in an amount of 0.1 to 3 mols, preferably 0.1 to 1 mol per 1 mol of an organoborosiloxane. If the amount of the organic compounds is less than 0.1 mol, a satisfactory heat-resistance can not be achieved. On the other hand, if the amount of the organic compounds is more than 3 mols, an unreacted material is left and the heat-resistance is reduced.

The above reaction should preferably be carried out at a temperature of 250°–450° C. If the reaction temperature is lower than 250° C., the reaction does not sufficiently proceed. If the reaction temperature is higher than 450° C., it is undesirable since decomposition of a borosiloxane bond and pyrolysis of an organic group start to occur. The softening point of the organic-inorganic compound binder of this invention can be suitably controlled by appropriately choosing reaction temperature and reaction time conditions. Generally, a higher reaction temperature and a longer reaction time give a higher softening point.

The above reaction to produce the organic-inorganic compound binder used in this invention is more fully described in our Japanese Patent Application No. 53-54036 filed on May 9, 1978.

The organic-inorganic compound binder used in this invention may also be an organic-inorganic compound obtained by reacting the above mentioned organoborosiloxanes in the presence of a catalyst (i) selected from the group consisting of the powders of at least one metal selected from the group of the transition metals such as Ni, Ti, Zr, Hf, V, Nb, Ta, Cr, Mo, W, Co and the like, the actinide metals such as U, Th and the like, the lanthanide metals such as elements from La to Lu and Y, and their alloys such as $SmCo_5$, $Y_2Ni_{17}$ and the like, or in the presence of a catalyst (ii) selected from the group consisting of persulfates such as ammonium persulfate, sodium persulfate and the like, organic peroxides such as benzoyl peroxide, diacetyl peroxide and the like, and the halogenides of Al, Fe, B, Ga and In, at 300°–550° C., preferably 300°–450° C. in an unoxidizable atmosphere such as argon, helium, nitrogen, carbon dioxide gas or the like.

The above catalyst (i) or (ii) is used in an amount of 0.5–10 parts by weight, preferably 1–5 parts by weight per 100 parts by weight of an organoborosiloxane compound.

This second reaction to produce the organic-inorganic compound binder used in this invention is more fully described in our Japanese Patent Application No. 53-54037 filed on May 9, 1978.

The permanent magnet powder used in this invention may be the powder of well known permanent magnets, examples of which include cast magnets such as alnico magnets; hard ferrite magnets such as barium ferrite, strontium ferrite or the like; and rare earth-cobalt magnets such as samarium-cobalt, cerium-cobalt or the like. The rare earth-cobalt magnets may generally be expressed by the formula $RCo_5$, wherein R represents one or more elements of the rare earth series or their analogues such as La, Ce, Pr, Nd, Sm, Pm, Eu, Gd, Tb, Dy, Ho, Er, Tm, Yb, Lu, Y, and misch cerium ($_{MM}Ce$); or $R(Co, Cu, Fe)_x$, wherein R represents one or more elements of the rare earth series or their analogues such as La, Ce, Pr, Nd, Sm, Pm, Eu, Gd, Tb, Dy, Ho, Er, Tm, Yb, Lu, $_{MM}Ce$, and $x=4.5-8.5$. A mixture of the powder of one or more of the above mentioned permanent magnets is used in this invention.

The amount of the organic-inorganic compound binder should be 2–30% by weight, preferably 2–20% by weight, more preferably 3–15% by weight, on the basis of the total weight of the composite magnet of this invention. If the amount of the binder is more than 30% by weight (for example, 70% by weight of $SmCo_5$ powder corresponding to 26% by volume, or the same amount of barium ferrite corresponding to 36% by volume), the permanent magnet function becomes very poor. On the other hand, if the amount of the binder is less than 2% by weight, the molding of the composite magnet becomes difficult.

This invention further provides a method for producing the above mentioned magnet. Thus, one method of this invention comprises the steps of (a) adding the powder of one or more permanent magnets selected from alnico cast magnets, hard ferrite magnets, and rare earth-cobalt magnets to a solution of an organic-inorganic compound binder containing boron and silicon dissolved in an organic solvent; (b) evaporating said solvent; (c) molding the resultant permanent magnet powder covered with said binder under a pressure of 0.1 to 5 tons/cm$^2$ in the presence or in the absence of a magnetic field of 12,000–5,000 oersteds, during which molding the mold and its contents are heated at 200°–450° C.; and (d) cooling the molded product.

In step (c) of the above method, if desired, the molding may be carried out at room temperature, and the molded product may then be heated at 200°–450° C. after being removed from the mold.

Another method of this invention comprises the steps of (a) molding powder of one or more permanent magnets selected from alnico cast magnets, hard ferrite magnets, and rare earth-cobalt magnets at room temperature under a pressure of 0.1–5 tons/cm$^2$ in the presence or in the absence of a magnetic field of 12,000–5,000 oersteds; (b) dipping the molded product in a solution of an organic-inorganic compound binder containing boron and silicon; (c) drying the dipped product; (d) heating the dried product at 200°–450° C.; and (e) cooling the heated product.

The particle size of the permanent magnet powder should preferably be not larger than 300 microns, which is the same as that of well known commercially available plastic bond magnet powder.

In order to obtain an anisotropic magnet, it is necessary to apply a magnetic field of 5,000–12,000 oersteds (Oe) during the production. If the intensity of the magnetic field is less than 5,000 Oes, a satisfactory orientation can not be achieved, while an intensity of the magnetic field of higher than 12,000 Oe(s) is unnecessary.

On the other hand, in order to obtain an isotropic magnet, it is not necessary to apply the above mentioned magnetic field.

The pressure applied during the molding should preferably be 0.1 to 5 tons/cm$^2$. If the molding pressure is less than 0.1 ton/cm$^2$, the strength of the molded product is not sufficient, and therefore there is a danger that the product will break during the subsequent heating procedure or when being removed from the mold. On the other hand, the application of a molding pressure higher than 5 tons/cm$^2$ is not preferable in view of the design of the heat-resistant mold and does not increase the packing density any further.

The heating temperature during the production should preferably be 200°–450° C. The lower limit of the Tg point (glass transition temperature) of the organic-inorganic compound binder used in this invention should be 180° C. in view of the heat-resistant feature of the magnet of this invention. The polymerization reaction of the organic-inorganic compound binder can be further accelerated by maintaining the temperature of the mold or the atmosphere higher than the Tg point. For this purpose, a temperature of less than 200° C. is not preferable. At first, the Tg point of the binder should be as low as possible in view of the molding operation, thus facilitating processibility. Thereafter, the heating during the process increases the degree of polymerization, thus providing a harder magnet. On the other hand, a heating temperature higher than 450° C. is not preferable since decomposition of the organic-inorganic compound binder starts to occur.

The heating time in this temperature range should preferably be from 10 minutes to 10 hours.

This invention is further illustrated by the following Examples.

EXAMPLE 1

Boric acid, 310 g, and diphenyl dichlorosilane, 1898 g, together with n-butyl ether, 3 liters, were placed in a three-forked flask. The contents were reacted at 100° C. for 18 hours while stirring and a white precipitate was obtained after cooling. After removing n-butyl ether, the precipitate was washed with methanol to remove unreacted boric acid, and the resultant product was further washed with water to obtain 1680 g of borodiphenyl siloxane having a number-average molecular weight of about 400. 200 g of the borodiphenyl siloxane thus synthesized was intimately mixed with 20 g of phenol, and the mixture was reacted in a 500 ml-flask in a nitrogen atmosphere, heating the mixture to 450° C. at a heating rate of 55° C./hour and maintaining the temperature at 450° C. for 1 hour while stirring to obtain a light yellowish resinous compound. 4 g of the organic-inorganic compound binder thus obtained was measured, and was dissolved in 10 cc of tetrahydrofuran as a solvent to prepare a solution. 96 g of fine powder (average particle size=3.5μ) of samarium cobalt ($SmCo_5$) was added to the above prepared solution. After fully stirring the mixture, tetrahydrofuran was evaporated to obtain $SmCo_5$ powder having its particle surface covered with the organic-inorganic compound binder. 50 g of the powder thus obtained was placed in a mold having a diameter of 30 mm, and was pressed under a pressure of 100 kg/cm$^2$ in the presence of a magnetic field of 10,000 Oes. The molded product was then maintained at 420° C. for 30 minutes, and was secondly pressed under a pressure of 5 tons/cm$^2$ in the presence of a magnetic field of 5000 Oes or higher. The magnetic properties of the composite magnet thus prepared are shown in the following Table 1. Samples Nos. 1 to 4 had respectively different binder contents, and were molded in the presence of an orientation magnetic field. Sample No. 5 had the same composition as in Sample No. 1, but it was molded in the absence of an orientation magnetic field.

TABLE 1

| Sample No. | Polymer Binder (g) | $SmCo_5$ (g) | Residual Magnetism Br (KG) | Coercive Force BH (KOe) | Maximum Energy Products (B · H) Max (MGOe) |
|---|---|---|---|---|---|
| 1 | 4 | 96 | 6.3 | 5.2 | 8.2 |
| 2 | 5 | 95 | 5.7 | 4.6 | 6.6 |
| 3 | 10 | 90 | 4.9 | 3.8 | 4.7 |
| 4 | 15 | 85 | 4.2 | 3.0 | 3.0 |
| 5 | 4 | 96 | 2.5 | 2.1 | 1.4 |

EXAMPLE 2

Barium ferrite powder (Sample No. 6) having an average particle size of 1μ and alnico magnet powder (Sample No. 7) and alnico 8 magnet powder (Sample No. 8) each having an average particle size of 210μ were coated with 5% by weight of an organic-inorganic compound binder which was prepared in the same manner as in Example 1. 50 g of this powder was placed in a mold having a diameter of 30 mm, and was molded under a pressure of 5 tons/cm$^2$ in the presence of a magnetic field of 10,000 Oes applied vertically with respect to the direction of pressing. Thereafter, heat was applied from the outside, and the temperature was maintained at 250° C. for 30 minutes. After the product was cooled, the magnetic field was removed.

On the other hand, samples were prepared in the absence of a magnetic field, and they were referred to as Nos. 6', 7' and 8'. The results are shown in the following Table 2.

TABLE 2

| Prepared in the Presence of a magnetic field | | | | Prepared in the absence of a magnetic field | | | |
|---|---|---|---|---|---|---|---|
| Sample No. | Br (KG) | BHc (KOe) | (B · H) max (MGOe) | Sample No. | Br | BHc | (B · H) max |
| 6 | 2.3 | 1.60 | 1.05 | 6' | 1.5 | 1.20 | 0.47 |
| 7 | 2.9 | 0.55 | 0.45 | 7' | 1.8 | 0.50 | 0.30 |
| 8 | 4.0 | 0.90 | 0.95 | 8' | 2.7 | 0.75 | 0.48 |

EXAMPLE 3

In order to make a comparison with the above Samples Nos. 2, 6 and 8, a composite magnet of a combination of ethylene-vinyl acetate type thermoplastic resin with $SmCo_5$ powder (Sample No. 9), a composite magnet of a combination of epoxy resin with $SmCo_5$ powder (Sample No. 10), and a sintered $SmCo_5$ magnet (Sample No. 11) were prepared, and the magnetic properties of these six samples at high temperature were investigated. Each sample was maintained at a predetermined temperature for 15 minutes, and was cooled to room temperature (25° C.).

In comparison with the magnetic properties of the original starting magnet (at 25° C.), irreversible loss was measured, and the temperature coefficient of open magnetic circuit residual magnetic flux was measured from rising and falling gradients in the process of raising and lowering temperature. The results are shown in the following Table 3.

TABLE 3

| Sample No. | Temperature Range (°C.) | Irreversible Loss (%) | Temperature Coefficient (%/°C.) |
|---|---|---|---|
| 2 | 25–100 | 2.0–3.5 | 0.034–0.111 |
| 6 | 25–100 | 1.0–1.6 | 0.16–0.18 |
| 8 | 25–100 | 0.7–0.9 | 0.021–0.033 |
| 9 | 25–90 | 18–23 | 0.037–2.35 |
| 10 | 25–100 | 2.5–5.3 | 0.035–0.120 |
| 11 | 25–100 | 0.3–2.0 | 0.032–0.039 |
| 2 | 25–250 | 13.2–15.5 | 0.16–0.25 |
| 6 | " | 3.2–5.3 | 0.17–0.20 |
| 8 | " | 3.3–5.2 | 0.033–0.055 |
| 11 | " | 4.1–6.7 | 0.038–0.105 |

Sample No. 9 prepared using the conventionally known thermoplastic resin as a binder began to transform at 85° C. or higher and Sample No. 10 prepared using the thermosetting resin as a binder began to transform at 150° C. or higher. Both samples lost the magnet function. On the other hand, as shown in Table 3, the composite magnets of this invention did not transform and retained a satisfactory magnet function although they were maintained at 250° C. for 15 minutes. However, Sample No. 2 had a specially large irreversible loss, and accordingly it is preferable to previously subject the magnet to aging for 0.5 to 1 hour at the temperature at which the magnet is practically used. As shown in Table 4, the temperature coefficient of open magnetic circuit residual magnetic flux is stabilized after aging.

TABLE 4

| Sample No. | Temperature Coefficient after Aging at 300° C. (%/°C.) |
| --- | --- |
| 2 | 0.051 |
| 6 | 0.187 |
| 8 | 0.022 |

EXAMPLE 4

20 g of terephthalic acid was mixed with 200 g of borodiphenyl siloxane prepared in Example 1 in a flask of 500 ml, and the resultant mixture was heated to 350° C. at a heating rate of 100° C. per hour in a nitrogen atmosphere while stirring to obtain a light yellowish resinous compound. 5 g of the organic-inorganic compound binder thus obtained was dissolved in tetrahydrofuran. SmCo$_5$ powder was coated with this solution, and was molded into a magnet in the same manner as in Example 1. Magnetic properties of the composite magnet thus obtained were as follows:

Br=5.8 KG, BHC=3.8 KOe, (B-H)max=6.2 MGOe
This composite magnent did not transform though it was heated to 400° C.

Figure 2:
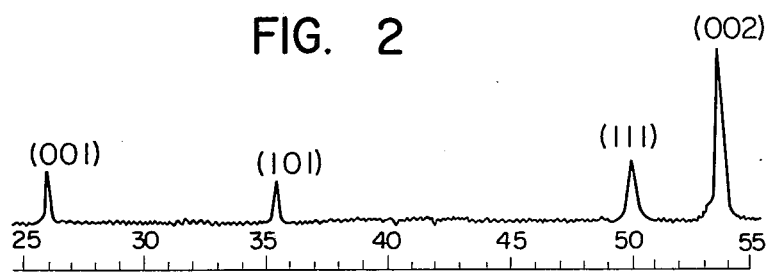
FIG. 2 shows the X-ray diffraction pattern of a face vertical with respect to the orientation direction of said magnet powder.

The X-ray diffraction pattern of a face in parallel to the orientation direction of this SmCo$_5$ powder is shown in FIG. 1. The X-ray diffraction pattern of a face vertical with respect to the orientation direction of this SmCo$_5$ powder is shown in FIG. 2. The X-ray tube used a Co target tube.

As can be seen from FIGS. 1 and 2, the reflection of C-face of the SmCo$_5$ powder, i.e. (001) and (002) is strong in the case of the X-ray diffraction pattern of a face vertical with respect to the orientation direction, while the reflection of a column face vertical to the C-face, i.e. (110) and (200) is strong in the case of the X-ray diffraction pattern of a face in parallel to the orientation direction. Thus, it was proved that the powder was well oriented.

EXAMPLE 5

4 g of aluminum chloride was intimately mixed with 200 g of borodiphenyl siloxane prepared in Example 1, and the mixture was sealed in a quartz tube in vacuum. The mixture was then heated at 420° C. for 20 hours to obtain a brown resinous compound binder. 95 g of SmCo$_5$ powder was molded under a pressure of 3 tons/cm$^2$ in the presence of a magnetic field of 10,000 Oes. The molded product was then dipped in a solution having 5 g of the above prepared organic-inorganic compound binder dissolved in tetrahydrofuran. The dipped product was then dried and maintained at 300° C. for 1 hour. It was then cooled. The product thus treated was heated from room temperature to 250° C. and cooled back to room temperature, during which magnetic properties were investigated. The results were as follows:

Irreversible Loss: 10.1–12.4%
Temperature Coefficient: 0.09–0.18%/°C.

As fully mentioned in the above Examples, the composite magnet of this invention has better magnetic properties at high temperature than the conventional plastic magnet. The composite magnet of this invention can also be molded into a finally desired shape by a molding procedure only without mechanical processing, thus providing a magnet having a high accuracy in size, which can be used as a permanent magnet for rotary machineries, meters and the like. Moreover, the organic-inorganic compound binder used in this invention is a thermoplastic resin, and therefore its scrap can be reused, thus reducing its manufacturing cost.

What we claim is:

1. A heat-resistant composite magnet comprising (i) 70 to 98% by weight of the powder of one or more permanent magnets and (ii) 2 to 30% by weight of a binder obtained by reacting an organoborosiloxane having the bonding

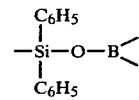

with at least one compound selected from the group consisting of a phenol and an aromatic carboxylic acid.

* * * * *